US008400509B2

(12) United States Patent
Rapoport et al.

(10) Patent No.: US 8,400,509 B2

(45) Date of Patent: Mar. 19, 2013

(54) AUTHENTICATION APPARATUS FOR VALUE DOCUMENTS

(75) Inventors: William Ross Rapoport, Bridgewater, NJ (US); Kwong Wing Au, Bloomington, MN (US); James Kane, Lawrenceville, NJ (US); Carsten Lau, Niedersachsen (DE)

(73) Assignee: Honeywell International Inc., Morristown, NJ (US)

( * ) Notice: Subject to any disclaimer, the term of this patent is extended or adjusted under 35 U.S.C. 154(b) by 223 days.

(21) Appl. No.: 12/877,618

(22) Filed: Sep. 8, 2010

(65) Prior Publication Data

US 2011/0069174 A1 Mar. 24, 2011

Related U.S. Application Data

(60) Provisional application No. 61/244,583, filed on Sep. 22, 2009.

(51) Int. Cl.
*H04N 7/18* (2006.01)

(52) U.S. Cl. ..................... 348/161; 194/206; 250/459.1; 382/135

(58) Field of Classification Search ............... 428/195.1; 194/206; 250/459.1; 235/439; 380/55; 382/135
See application file for complete search history.

(56) References Cited

U.S. PATENT DOCUMENTS 5,679,959 A 10/1997 Nagase
5,790,697 A * 8/1998 Munro et al. ................ 382/135
6,165,592 A * 12/2000 Berger et al. .............. 428/195.1
6,813,011 B2 11/2004 Gardner et al.
6,861,012 B2 3/2005 Gardner et al.
7,449,698 B2 11/2008 Nguyen et al.
8,245,831 B2 * 8/2012 Holl et al. ..................... 194/206
2001/0035501 A1 11/2001 Taylor et al.
2002/0053597 A1 5/2002 Ehrhart et al.
2003/0107004 A1 6/2003 Leach et al.
2006/0131425 A1 6/2006 Stenzel et al.
2007/0295116 A1 12/2007 LeMercier et al.
2008/0048106 A1 2/2008 Blanchard et al.
2008/0135780 A1 6/2008 Giering et al.
2009/0218401 A1 * 9/2009 Moran et al. .................. 235/439
2010/0067691 A1 * 3/2010 Lin et al. ......................... 380/55
2010/0102250 A1 * 4/2010 Li et al. ...................... 250/459.1

FOREIGN PATENT DOCUMENTS

JP 2004-185126 A 7/2004
WO 2007/068955 A1 6/2007

* cited by examiner

*Primary Examiner* — Dustin Nguyen
(74) *Attorney, Agent, or Firm* — Ingrassia Fisher & Lorenz, P.C.

(57) ABSTRACT

A value document authentication apparatus and system that includes value document substrates having a uniform distribution of one or more phosphors that emit infrared radiation in one or more wavelengths, which can be measured at the same location on the value document that is illuminated by a phosphor exciting light source when the document passes the light source with a uniform velocity. The illumination and measurement locations on the value document can be offset. The measured infrared radiation as a series of overlapped measurements along a pre-selected track in the value document represents an intensity profile, which can be normalized after removing high variations. The normalized intensity profile of a test value document can be compared with normalized intensity profile from valid reference documents to authenticate the test value document.

11 Claims, 3 Drawing Sheets

AUTHENTICATION APPARATUS FOR VALUE DOCUMENTS

RELATED APPLICATIONS

This application claims the benefit of U.S. Provisional Application Serial No. 61/244,583, filed on Sep. 22, 2009, currently pending, which is hereby incorporated by reference in its entirety.

FIELD OF THE INVENTION

The present technology relates to a validation apparatus that can be utilized to authenticate a value document. The present technology also relates to validation systems that incorporate security features in and/or on the value document that are difficult to replicate and include detection discrimination methods and features that are complicated enough to prevent or reduce the likelihood of counterfeiting or forging of the value document.

DESCRIPTION OF RELATED ART

There are many ways to validate a value document, from simple to complex. Some methods involve visible (i.e. overt) features on or incorporated into a document, such as a hologram on a credit card, an embossed image or watermark on a bank note, a security foil, a security ribbon, colored threads or colored fibers within a bank note, or a floating and/or sinking image on a passport. While these features are easy to detect with the eye and can not require equipment for authentication, these overt features are easily identified by a would-be forger and/or counterfeiter. As such, in addition to overt features, hidden (i.e. covert) features can be incorporated in value documents. Covert features include invisible fluorescent fibers, chemically sensitive stains, fluorescent pigments or dyes that are incorporated into the substrate of the value document. Covert features can also be included in the ink that is printed onto the substrate of the value document or within the resin used to make films that are used in laminated value documents. Since covert features are not detectable by the human eye, detectors configured to detect these covert features are needed to authenticate the value document.

There are many validation systems (e.g. covert features and corresponding detectors) that are used to, for instance, authenticate bank notes. For example, U.S. Pat. No. 4,446,204 to Kaule, et al. discloses a security paper with authenticable features in the form of added or applied coloring agents which on the one hand make it possible to check the IR-transmission properties of the security paper, if appropriate, even in the printed image, and on the other hand have magnetic properties, wherein both IR transmission and magnetic tests can be uninfluenced by one another but are capable of being carried out at the same position on the security paper. Known detection devices are then used to match detectors to the differently lying spectral region of the authenticable features for validation. Further, U.S. Pat. No. 5,679,959 to Nagase discloses a bill discriminating apparatus that includes a light source for projecting a stimulating light onto a surface of a bill, a photomultiplier that photoelectrically detects the light emitted from the bill surface in response to the irradiation with the stimulating light and producing detected data corresponding to an amount of the detected light, a ROM for storing reference data, and a central processing unit ("CPU") for comparing the detected data produced by the photomultiplier and the reference data stored in the ROM.

Many known validation systems involve detecting a covert authenticatable feature and evaluating its emission spectra (e.g. emissions of the feature alone or emissions as a function of decay time and the like). If the emissions alone are detected, then the value document is deemed authentic, otherwise it is rejected as a counterfeit. One problem with this type of existing validation system arises when the authenticatable feature is entirely contained in the printed ink on a substrate because it is subjected to wear and attrition loss. As a result, there is unpredictable deterioration of the authenticatable feature's emission spectra amplitude, and thus, the authentication apparatus can incorrectly identify an authentic document as a counterfeit.

SUMMARY OF THE INVENTION

This present technology relates to a value document authentication apparatus including: a. at least one phosphor exciting light source; b. at least one sensor arranged to detect, with spectral resolution, infrared radiation emitted from the value document within a pre-selected track excited by the phosphor exciting light source, wherein the value document includes a uniform distribution of at least one phosphor capable of emitting infrared radiation with at least one distinct infrared wavelength and the phosphor exciting light source has sufficient energy to excite emission from the phosphor, wherein the pre-selected track comprises the uniform distribution of at least one phosphor and a pre-selected pattern capable of affecting intensity of the infrared radiation, and wherein the sensor detects the intensity of the infrared radiation of at least one wavelength emitted at a location within a series of pre-selected partially overlapping regions of the pre-selected track thereby producing intensity data when the value document is exposed to the sensor at a pre-selected uniform velocity; and c. at least one processing unit including (i) a normalized true intensity data storing unit that stores normalized true intensity data obtained from detecting true intensity data at the pre-selected locations and normalizing the true intensity data of a pre-selected number of authentic reference value documents; (ii) a normalized test intensity data storing unit that stores normalized test intensity data obtained from detecting test intensity data of a test value document at the same pre-selected locations as the authentic reference value documents and normalizing the test intensity data; and (iii) a comparing unit that compares the normalized true intensity data to the normalized test intensity data and authenticates or rejects the test value document.

This invention also relates to a value document authentication apparatus including a. a movement device that exposes the value document to one or more phosphor exciting light sources at a pre-selected uniform velocity, wherein the one or more phosphor exciting light sources illuminates a pre-selected track on the value document; b. a value document substrate having (i) a uniform distribution of one or more phosphors that absorb phosphor exciting light, emit infrared radiation having two or more distinct wavelengths, and have an emission decay time greater than 0.1 milliseconds and less than 10 milliseconds, and (ii) a pre-selected pattern capable of reducing phosphor exciting light available for exciting the one or more phosphors and absorbing emitted infrared radiation; c. one or more sensors capable of measuring infrared radiation from an area smaller in width than the pre-selected track width in a series of partially overlapping regions, thereby creating intensity data within each of the partially overlapping regions when the value document is exposed to the one or more sensors; and d. one or more processing units that (i) normalize intensity data by adjusting area under an intensity data curve to be one hundred percent to remove statistically significant variations; (ii) store normalized true intensity data for one or more value document orientations of a pre-selected amount of authentic reference value documents; (iii) average normalized true intensity data for each of the one or more value document orientations; (iv) store normalized test intensity data of a test value document generated at the same pre-selected velocity along the same pre-selected track in the same series of partially overlapping regions as the authentic reference value document; (v) compare the normalized test intensity data with the averaged normalized true intensity date for each of the one or more value document orientations; and (vi) validate test value document authenticity.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
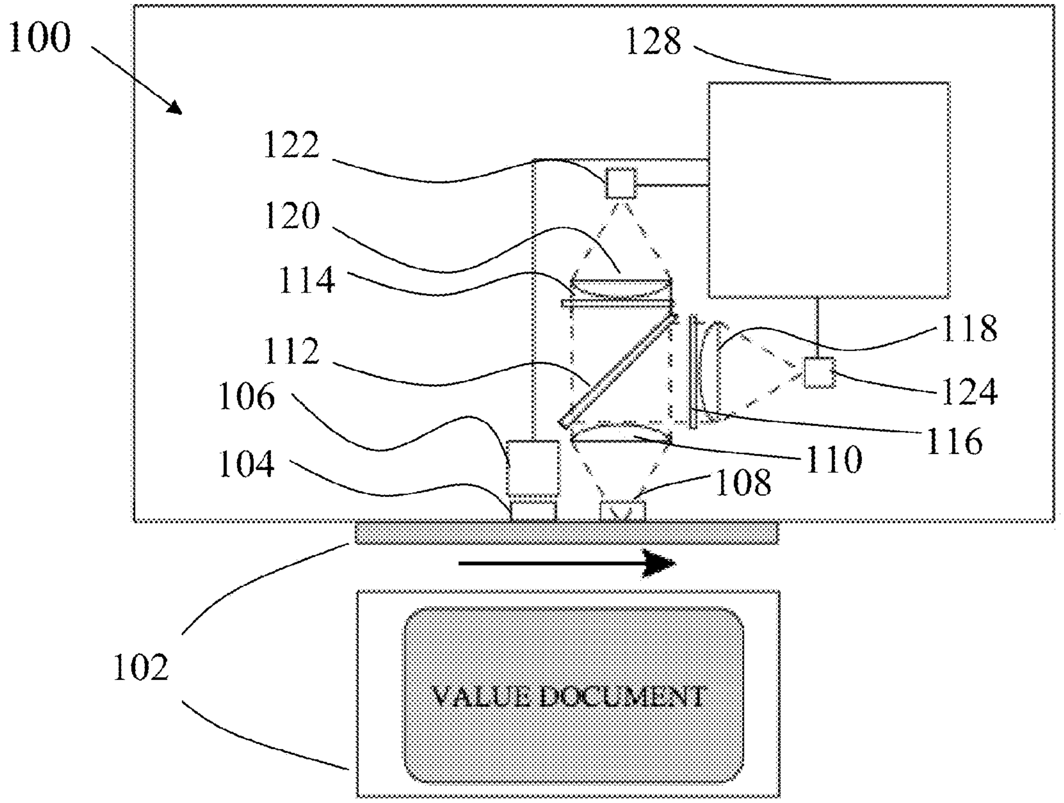
FIG. 1 illustrates a schematic diagram of one example of an authentication apparatus wherein a value document is moved under a phosphor exciting light source and the emitted infrared radiation from the uniform distribution of one or more phosphors in the value document substrate, attenuated by a printed pattern, is measured by two sensors at two or more wavelengths.

Value documents can be designed with one or more covert authenticatable features on or incorporated into the substrate of the document in addition to the overt features that make a value document recognizable by the general public. Covert features can include, but are not limited to, microprinting, multiple inks, UV absorbing visible emitting materials, upconverters, complex printing profiles, clear inks, infrared absorbing materials, magnetic inks, phosphors and varnishes. Over time, the use of covert features has become less secure since counterfeiters have become more sophisticated and have greater access to scientific equipment that can detect the incorporation of these features in value documents.

One method of improving the security of a value document can be to use authenticatable features, such as phosphors, that are hard to manufacture and/or are difficult to identify within the document. Another method of improving the security of a value document can be to increase the intelligence of a detector, so that rather than having the pass/fail parameter of a document depend on detecting the presence of the authenticatable feature alone, the detector can be configured to, for instance, detect in pre-selected regions of emission spectra, or be dependent upon amounts of the authenticatable feature, or dependent upon interactions between authenticatable features. Further yet, by using materials that are difficult to make and/or that exhibit spectral and temporal characteristics that are very difficult to mimic, combined with a smart detector, the security of a value document can be enhanced.

Typically, in the production of a value document there are detailed specifications for printing features and cutting the documents into individual value documents from larger sheets. These specifications allow for acceptable errors with regard to a reference edge, such as the long edge of the value document. The allowed errors in cutting and printing present challenges when comparing the measured signal of a test document with the measured signals of a true value document. If a conventional authentication system were to measure the entire width of the value document, then take predetermined segment measurements in the long direction at a pre-determined spacing, the CPU would integrate all of the authenticatable features rather than differentiate these features which would result in a low discriminating system.

In systems of the present technology, a pre-selected track having a pre-selected consistent width across (i.e. parallel lines) the entire value document can be selected to be a certain distance from a reference edge of the value document. When the value document is rectangular, for example, having a length that is longer than the width thereof, the reference edge of the value document can be an edge that spans the length of the document. The pre-selected track has a pre-selected track width that is the same width as the detection aperture, since the pre-selected track is the area on the value document in which the detection aperture detects the phosphors once they have been excited. While there are numerous ways to select and obtain reference data points, one example includes selecting a pre-selected track with a preselected-track width of about 1 mm to about 10 mm, preferably about 2 mm to about 8 mm, and more preferably about 3 mm to about 5 mm. A pre-selected track width within these preferred ranges can allow intensity data to be measured at high velocity, such as seven to ten meters per second.

A value document authentication apparatus of the present technology can include at least one light source that illuminates a pre-selected track on a value document in pre-selected partially-overlapping regions, thereby exciting the same or different infrared emitting phosphors that are uniformly distributed within the substrate of the value document. The overlap preferably occurs in the pre-selected track, along the length of the value document. For example, the detection aperture can be selected to have a 4 mm diameter thereby creating a pre-selected track having a pre-selected track width of 4 mm, wherein 4 mm of the length of the value document will be detected each time the detector functions to detect the phosphors that have been excited by the at least one light source. If, for example, such a detector is selected to detect once every 2 mm along the length of the value document, pre-selected partially-overlapping regions are thereby created, because the detector will detect at least a portion of the pre-selected track that it previously detected each time it functions to detect. If, on the other hand, such a detector is selected to detect once every 8 mm along the length of the value document, pre-selected separate regions can be created, because the detector will not detect any portion of the pre-selected track that it previously detected each time it functions to detect.

The one or more light sources can be selected such that they have sufficient energy to excite emission from the phosphors, for example, any phosphor exciting light source such as flashlamps, LEDs, lasers and the like. The one or more phosphors can have a decay time greater than about 0.1 milliseconds to about 10 milliseconds. Phosphors having such a decay time allow the excitation location and the emission detecting location to be offset from each other. The excitation location is the place at which the at least one light source is located on the authentication apparatus, and the emission detecting location is the place at which the detection aperture is located on the authentication apparatus. An offset between the excitation location and the emission detecting location can be employed, when using, for example, a light source having a long emission trail such as LEDs and flash lamps, since filters alone might not be able to separate out potential emission contributions from the light source. When, for instance, however, a laser is used as a phosphor exciting light source, the offset distance can be nearly zero due to the spectral purity of the laser light. Any emissions from the laser are narrow enough to be filtered out, such that these emissions will not interfere with the infrared emission wavelengths generally emitted by phosphors. The type, quantity, and use of filters within the authentication apparatus can be determined by one skilled in the art. In addition or alternatively to using filters, by offsetting the excitation location from the emission detecting location, light interference from the light source can be minimized or prevented altogether.

The decay time of the one or more infrared emissions of the one or more phosphors can be modified to some degree by those skilled in the art to produce changes in spectral and temporal characteristics to make reverse engineering more difficult. Preferably, the decay time can be sufficiently long so that the value document emits in the infrared with decreasing intensity as a function of distance from the incident illumination light based on a moving substrate or moving light source. Thus, the sensor can detect a location further away from the excitation location by an offset distance that represents a time that is less than two or more decay constants of the phosphors used in the substrate, such that the wavelength distribution of the incident phosphor exciting light does not interfere with the infrared radiation detected by the sensor, enhancing the sensitivity of the validation device.

A value document can be passed through the authentication apparatus at a pre-selected uniform velocity, such as, for example, greater than about 3-10 m/s. Alternatively, the authentication apparatus can be passed over the value document at a pre-selected uniform velocity such as greater than about 0.1-1 m/s. In either case, the light source illuminates uniformly distributed phosphors within a pre-selected track. As mentioned above, the exciting area (i.e. the pre-selected track) is determined by the spot size of the sensor (i.e. detecting aperture) and is at least as wide as the detection window. By selecting the exciting area to be at least as wide as the detection window, the authentication apparatus maximizes the excitation data, but minimize errors due to variability such as errors due to registration (i.e. printing with respect to the edge or how bank notes are cut), movement due to machine error, and printing and/or cutting.

In a detection window, one or more sensors measure and/or detect, with spectral resolution, the infrared radiation intensity emitted from the value document at one or more wavelengths at one or more locations within a pre-selected number of partially overlapping regions of the pre-selected track, thereby producing intensity data for each of the one or more wavelengths as the value document is exposed to at least one sensor at a pre-selected uniform velocity. Suitable sensors include, for example, silicon, InGaAs, PbS, Ge and others that have the required spectral response, acceptable noise parameters, bandwidth and/or shunt impedance in the spectral detection regions as determined by one skilled in the art. These sensors produce signals that canbe amplified by low noise electronics to a sufficient level such that they can be converted to digital values for processing. The output from the one or more sensors depicts the intensity data of the infrared radiation within the pre-selected track.

In one example, intensity data can be generated for one or more, preferably two or more, pre-selected infrared wavelengths by one or more, preferably two or more, sensors at the same spatial location in the value document within the pre-selected track. In a preferred embodiment, two or more sensors can be used to detect two or more distinct (i.e. separable in either time or spectra with regard to the detection capability) infrared wavelengths, wherein the sensor output depicts the intensity data for each infrared wavelength at the same spatial position in the value document. The authentication at two or more pre-selected infrared wavelengths by two or more distinct sensors provides intensity spectra for authenticating on a segment by segment basis.

If an unprinted document substrate comprising a uniform distribution of at least one phosphor is passed through the present authentication apparatus, illuminated by a phosphor exciting light source, and measured for emitted infrared radiation, the sensor will produce uniform intensity emission data with no observable patterns. However, when the substrate has a pre-selected pattern (e.g., printed or embossed ink which may or may not have additional covert pigments and/or dyes, holograms, security foils or threads) on or within it, the emitted infrared radiation of the excited phosphors can be affected. The pre-selected pattern, depending upon its composition, can modulate and/or attenuate the excitation of the phosphor by filtering light from the light source and/or can also modulate and/or attenuate the intensity of the infrared radiation emitted by the phosphors due to the absorption characteristics of the pattern. The pre-selected pattern can also completely or partially mask the emitted infrared radiation of the phosphors. The affect of a pre-selected pattern including patterns with additional security features creates value document characteristics in terms of measurable distributions of intensity from the infrared emitting phosphors as a function of time or distance along the value document when measured by one or more sensors. In one example, the security of a value document can be increased by using the interaction of the infrared emitting phosphors with the pre-selected pattern when designing the validation parameters.

Acceptable document substrates include paper, plastic, laminates, and the like with or without print or plastic layers thereon. The substrate has a uniform distribution of at least one phosphor that absorbs incident light and emits infrared radiation in one or more infrared wavelengths, preferably two or more infrared wavelengths. Once the substrate is made into a value document and all of the security features are present, the pass/fail parameters can be determined for the authentication apparatus for the value document. These pass/fail parameters can account for the excitation light source for the phosphor, infrared emission of the phosphor, the temporal signature of the phosphor, and/or the other security features present in or on the substrate.

For instance, when the value document is a bank note, there are two possible orientations for the front side and two possible orientations for the back side. In one example, true intensity data for these four possible orientations are recorded for a pre-selected number of new, authentic reference value documents, and the true intensity data is then normalized for each of the orientations, for each of the one or more sensors. To normalize the true intensity data for each of the pre-selected authentic reference value documents, the recorded data for one orientation is selected and areas of high variation based on statistical analysis, for instance, due to the presence of features such as holograms, security threads and the like, are removed from the true intensity data profile. Then, the area under the remaining intensity profile is set to a value of 100% by linearly adjusting the remaining intensities at each time or corresponding distance along the length of the value document at each of the one or more spectral sensor wavelengths. The normalized data for each of the pre-selected authentic reference value documents is then averaged. This process is performed for each of the four orientations. The normalized true intensity data for the four orientations of the bank notes at each of the one or more spectral sensor wavelengths is then stored as normalized true intensity data in one or more CPUs within one or more computers of the authentication apparatus.

Once the normalized true intensity data is generated, a test value document is passed through the authentication apparatus in order to generate normalized test intensity data at the same one or more wavelengths, on the same pre-selected track, within the same pre-selected partially overlapping regions, at the same uniform velocity as the authentic reference value documents. The test intensity data is normalized according to the same parameters as used with the authentic reference value documents (i.e., the same high variation areas are removed and the area under the intensity data curve is set to 100%). The normalized test intensity data is compared with each of the four normalized true intensity data sets. Upon comparison, the normalized test intensity data will be accepted or rejected based on pre-determined acceptance or rejection parameters. For instance, a pre-determined percent can be used as the acceptance or rejection parameter. Thus, for example, if 51% of the normalized test intensity data matches the normalized true intensity data at one orientation, then the test document is authenticated. In turn, if less than 51% of the normalized test intensity data matches the normalized true intensity data, then the test document is rejected as a counterfeit.

The one or more processing units, such as a computer, can be used to store normalized true and/or test data. As discussed above, the normalized true and/or test data is obtained from detecting true and/or test intensity data within the pre-selected track and normalizing it. In addition, at least one processing unit compares the normalized true intensity data to the normalized test intensity data and authenticates or rejects the test value document based on pre-determined pass/fail parameters.

It has been found that a soiled un-patterned document containing a uniform distribution of phosphors does not statistically significantly change the measured intensity data. Wear of a value document with a pattern has a more significant effect on the intensity of infrared emissions measured by a sensor because wear removes printed matter in some areas of the value document thereby providing a higher level of intensity of the infrared emission. When a test document is extremely worn in some specific areas, without accounting for this wear, in traditional systems, the value document can be rejected as not meeting the validation criteria. In one example, the present authentication apparatus can account for such wear by factoring in relevant error terms when setting pass/fail parameters.

For instance, the pre-selected track can be separated into a number of segments along the length of the value document, such as for instance three or more, preferably five or more equal or unequal, separate or partially overlapping segments, wherein each segment is a fraction of the total length of the value document, and collectively the segments cover every location along the length of the value document at least once. The comparison of normalized intensity data of both the test and authentic value document is made within each segment. When a pass parameter is met for a majority of the segments covering greater than 50% of the area of the value document, the test value document will be authenticated. By splitting the pre-selected track into segments, for instance, a range of variation can be measured when generating normalized true intensity data to account for authentic, but worn documents. This variation can be generated for each orientation of a value document.

The phosphors used herein can be any compound that is capable of emitting IR-radiation upon excitation with light. Suitable examples of phosphors include, but are not limited to, phosphors that comprises one or more ions capable of emitting IR radiation at one or more wavelengths, such as transition metal-ions including Ti-, Fe-, Ni-, Co-and Cr-ions and lanthanide-ions including Dy-, Nd-, Er-, Pr-, Tm-, Ho-, Yb- and Sm-ions. The exciting light can be directly absorbed by an IR-emitting ion. Acceptable phosphors also include those that use energy transfer to transfer absorbed energy of the exciting light to the one or more IR-emitting ions such as phosphors comprising sensitizers for absorption (e.g. transition metal-ions and lanthanide-ions), or that use host lattice absorption or charge transfer absorption. Acceptable infrared emitting phosphors include Er doped yttrium aluminum garnet, Nd doped yttrium aluminum garnet, or Cr doped yttrium aluminum garnet.

One or more phosphors having one or more, preferably two or more, emissions in the infrared can be added to the substrate during the substrate making process. Having two or more emissions provide for a complex spectral space, since most emitters have a large number of spectral lines wherein the amplitude of the individual emission is a function of different considerations such as the crystal host, temperature, ion doping levels, doped impurities and the like. While a counterfeiter can be able to determine the phosphor in the substrate, the counterfeiter will not be able to determine which spectral lines of the emissions are used as pass/fail parameters in the authentication apparatus.

FIG. 1 illustrates a schematic diagram of the authentication apparatus 100. A value document 102 passes beneath the authentication apparatus 100, moving first by an excitation window 104 at an excitation location. An exciting light source 106 provides a phosphor exciting light that passes through the excitation window 104 to excite phosphors contained in the value document 102, thereby illuminating a portion of the pre-selected track on the value document. The value document 102 then passes beneath a detection apperature 108 at an emission detecting location, wherein two infrared emission sensors 122, 124 detect two infrared emissions from the moving value document 102 as the emissions pass up through the detection aperture 108. The infrared light signal is roughly collimated by lens 110 in combination with lens 118 or 120. An energy splitter 112 passes some light signal to a first infrared filter 114, which is then focused by lens 120 onto sensor 122. The light signal that is reflected off of energy splitter 112 is filtered by a second infrared filter 116, and then is focused by lens 118 onto sensor 124. The CPU 128 collects the signals from sensors 122 and 124 generating intensity data, normalizes the intensity data and compares a test value document normalized intensity data with that stored for an authentic reference value document, thereby authenticating the test value document.

Figure 2A:
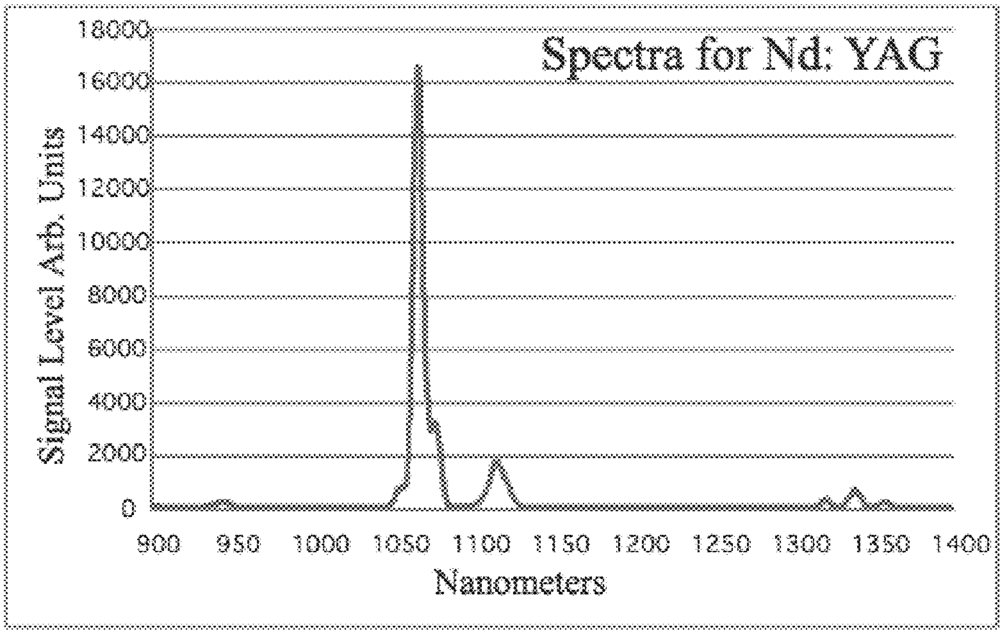
FIGS. 2*a* and 2*b* illustrate the infrared emission spectra of two suitable phosphors showing their respective infrared wavelength emissions.
Figure 2B:
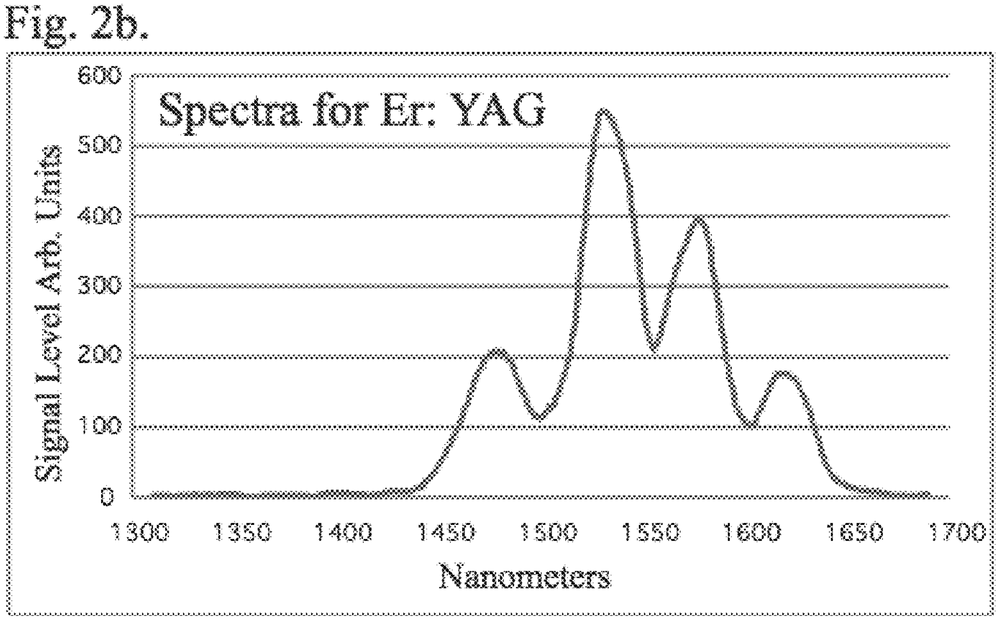

FIG. 2*a* illustrates the infrared emission spectra of Nd:YAG and FIG. 2*b* illustrates the infrared emission spectra of Er:YAG each showing infrared emissions at multiple wavelengths.

Figure 3A:
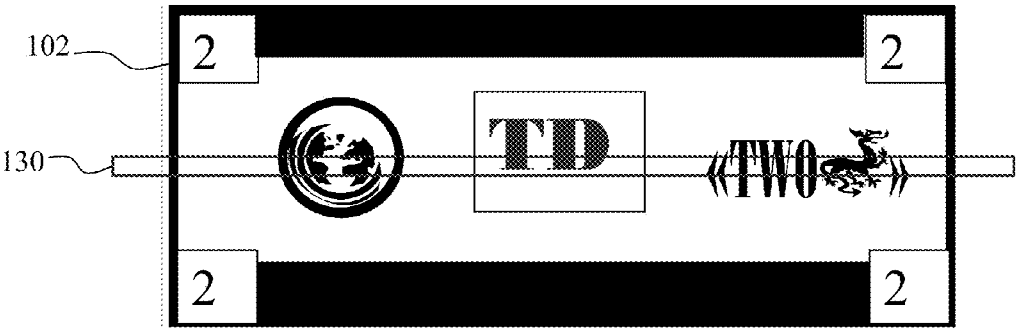
FIG. 3*a* illustrates one example of a value document having a pre-selected pattern and a pre-selected track selected relative to the document edge and FIG. 3*b* illustrates detector output of normalized intensity data of the emitted infrared radiation within the pre-selected track of the value document in FIG. 3*a*.
Figure 3B:
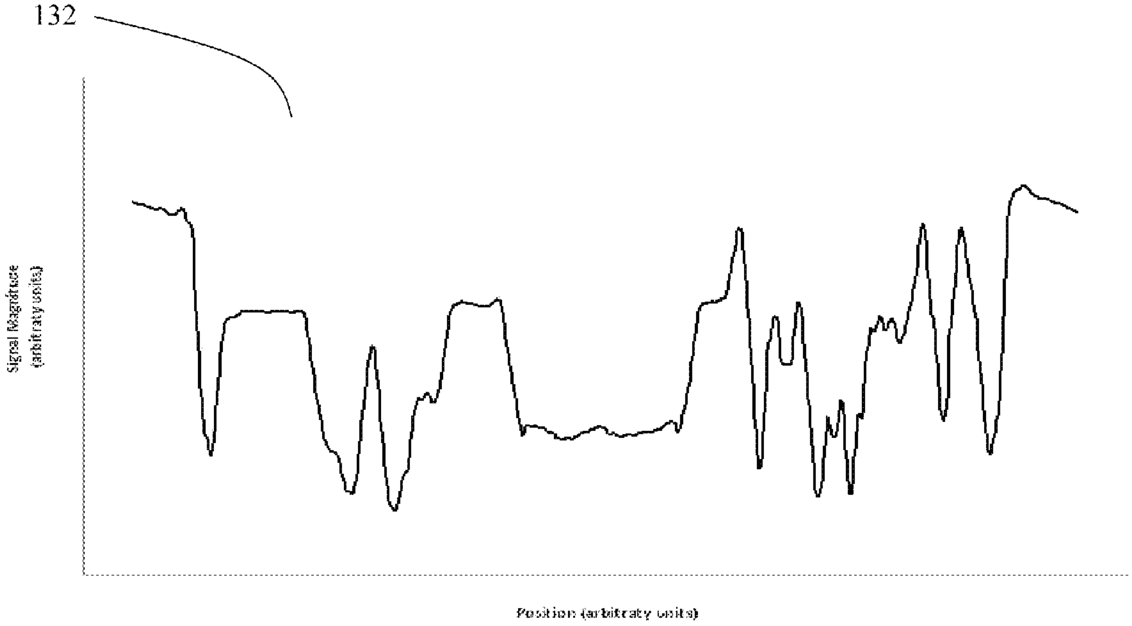

FIG. 3*a* is a depiction of a value document 102 with a pre-selected track 130 located relative to the document edge illustrating the image of the value document. A_representative measured infrared spectrum 132 taken from the value document 102 of FIG. 3*a* is shown in FIG. 3*b*.

From the foregoing, it will be appreciated that although specific examples have been described herein for purposes of illustration, various modifications can be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A value document authentication apparatus for authenticating a value document having a uniform distribution of at least one phosphor capable of emitting infrared radiation with at least one distinct infrared wavelength, and one or more pre-selected patterns capable of affecting intensity of the infrared radiation, the document authentication apparatus comprising:

a. at least one phosphor exciting light source having sufficient energy to excite emission from the at least one phosphor;

b. at least one sensor arranged to detect, with spectral resolution, infrared radiation emitted from the value document within a pre-selected track on the value document excited by the phosphor exciting light source;

wherein the pre-selected track comprises at least one pre-selected pattern capable of affecting intensity of the infrared radiation, wherein the sensor detects the intensity of the infrared radiation of at least one wavelength emitted from at least one location within a series of pre-selected partially overlapping regions of the pre-selected track, which represents an intensity profile, and produces intensity data when the value document is exposed to the sensor at a pre-selected uniform velocity, and c. at least one processing unit comprising:

(i) a normalized true intensity data storing unit that stores normalized true intensity data obtained from detecting true intensity data at the pre-selected locations and normalizing the true intensity data of a pre-selected number of authentic reference value documents, wherein the normalized true intensity data is obtained by removing areas of high variation from the detected true intensity data and by setting the area under the remaining intensity profile to a value of one hundred percent;

(ii) a normalized test intensity data storing unit that stores normalized test intensity data obtained from detecting test intensity data of a test value document at the same pre-selected locations as the authentic reference value documents and normalizing the test intensity data by removing areas of high variation from the detected test intensity data and by setting the area under the remaining intensity profile to a value of one hundred percent; and (iii) a comparing unit that compares the normalized true intensity data to the normalized test intensity data and authenticates or rejects the test value document.

2. The value document authentication apparatus according to claim 1, wherein the phosphor exciting light source is selected from the group consisting of high-energy light sources.

3. The value document authentication apparatus according to claim 2, wherein the high-energy light source is selected from the group consisting of flash lamp, LED lights, lasers, and combinations thereof.

4. The value document authentication apparatus according to claim 1, wherein the pre-selected track is divided into five or more pre-selected separate or partially overlapping segments, wherein each pre-selected separate or partially overlapping segment is a fraction of the total length of the value document and the pre-selected separate or partially overlapping segments collectively cover every location along the length of the value document within the pre-selected track at least once.

5. The value document authentication apparatus according to claim 4, wherein the processing unit authenticates the value document based on at least a majority of the pre-selected separate or partially overlapping segments coving greater than 50% of the length of the value document.

6. The value document authentication apparatus according to claim 1, wherein the uniform distribution of at least one phosphor is capable of emitting infrared radiation with at least two distinct infrared wavelengths.

7. The value document authentication apparatus according to claim 1, wherein the uniform distribution of at least one phosphor has an emission decay time greater than 0.1 milliseconds and less than 10 milliseconds.

8. The value document authentication apparatus according to claim 1, wherein the pre-selected uniform velocity is greater than three meters per second.

9. The value document authentication apparatus according to claim 1, wherein the normalized true intensity data storing unit stores the averaged normalized true intensity data for the pre-selected number of authentic reference value documents.

10. A value document authentication apparatus for authenticating a value document having a uniform distribution of one or more phosphors that absorb phosphor exciting light, emit infrared radiation having two or more distinct wavelengths that have a emission decay time greater than 0.1 milliseconds and less than 10 milliseconds, wherein the value document also includes one or more pre-selected patterns capable of reducing phosphor exciting light available for exciting the one or more phosphors and absorbing emitted infrared radiation, the document authentication apparatus comprising:

a. a movement device that exposes the value document to one or more phosphor exciting light sources at a pre-selected uniform velocity, wherein the one or more phosphor exciting light sources illuminates a pre-selected track on the value document at an excitation location, the pre-selected track having a pre-selected track width and including at least one pre-selected pattern;

b. one or more sensors at an emission detecting location, the one or more sensors configured to measure infrared radiation from an area smaller in width than the pre-selected track width in a series of partially overlapping regions, thereby creating intensity data within each of the partially overlapping regions when the value document is exposed to the one or more sensors; and c. one or more processing units that (i) normalize intensity data by removing areas of high variation from detected intensity data and by adjusting area under an intensity data curve to be one hundred percent to remove statistically significant variations; (ii) store normalized true intensity data for one or more value document orientations of a pre-selected amount of authentic reference value documents, (iii) average normalized true intensity data for each of the one or more value document orientations; (iv) store normalized test intensity data of a test value document generated at the same pre-selected velocity along the same pre-selected track in the same series of partially overlapping regions as the authentic reference value document; (v) compare the normalized test intensity data with the averaged normalized true intensity data for each of the one or more value document orientations, and (vi) validate test value document authenticity.

11. The value document authentication apparatus according to claim 10, wherein the excitation location and emission detecting location is offset by a distance.

* * * * *